United States Patent
Devlin et al.

(10) Patent No.: US 8,951,589 B2
(45) Date of Patent: Feb. 10, 2015

(54) HEAT EXCHANGE APPARATUS AND METHOD

(76) Inventors: Julian A. Devlin, Hanover, NH (US); Marisa D. Devlin, Hanover, NH (US)

(*) Notice: Subject to any disclaimer, the term of this patent is extended or adjusted under 35 U.S.C. 154(b) by 253 days.

(21) Appl. No.: 13/191,061

(22) Filed: Jul. 26, 2011

(65) Prior Publication Data

US 2012/0027903 A1 Feb. 2, 2012

Related U.S. Application Data

(60) Provisional application No. 61/368,461, filed on Jul. 28, 2010.

(51) Int. Cl.
| | |
|---|---|
| A47J 36/26 | (2006.01) |
| A47J 36/24 | (2006.01) |
| A47J 41/00 | (2006.01) |
| A23C 3/03 | (2006.01) |

(52) U.S. Cl.
CPC ............ *A47J 36/2411* (2013.01); *A47J 41/005* (2013.01); *A23C 3/03* (2013.01); *A23C 3/031* (2013.01)
USPC ........... 426/109; 426/117; 426/130; 426/132; 215/11.1; 215/386; 220/694; 165/186

(58) Field of Classification Search
CPC ........... F25D 1/02; F25D 31/002; A23L 2/38; A23C 2210/00; A47J 41/005; A47J 41/0044; A47J 41/0061; A47J 41/0072; A47J 41/0077; B65D 81/18; B65D 81/3806; B65D 81/3841; B65D 81/3844; B65D 81/3869; B65D 81/3872; B65D 81/3809; B65D 85/80; B65D 7/22; B65D 11/16; B65D 21/0238
USPC ........ 426/109, 117, 130, 132; 215/11.1–11.6, 215/386; 220/568, 569, 577, 694; 206/219–221; 165/186
See application file for complete search history.

(56) References Cited

U.S. PATENT DOCUMENTS

| | | | | |
|---|---|---|---|---|
| 528,463 | A | * | 10/1894 | Busch ............................ 165/73 |
| 630,009 | A | * | 8/1899 | Smalley ....................... 277/644 |
| 1,056,882 | A | * | 3/1913 | Bonn ............................ 215/386 |
| 1,785,438 | A | | 12/1930 | Edlin |
| 1,887,280 | A | | 11/1932 | Biancalana |
| 1,967,469 | A | * | 7/1934 | Hughes ......................... 220/568 |
| 2,072,433 | A | * | 3/1937 | Solomon ...................... 220/568 |
| 2,137,676 | A | | 11/1938 | Martin |
| 2,512,284 | A | | 6/1950 | Mumford |
| 2,525,261 | A | * | 10/1950 | Henderson ............... 221/150 R |
| 2,756,031 | A | | 7/1956 | Sanstrom |
| 2,837,081 | A | | 6/1958 | Ayers |
| 2,894,657 | A | | 7/1959 | Griffin |
| 2,909,362 | A | * | 10/1959 | Scanlon ......................... 165/73 |

(Continued)

*Primary Examiner* — Drew Becker
(74) *Attorney, Agent, or Firm* — McLane, Graf, Raulerson & Middleton, Professional Association

(57) ABSTRACT

A heat exchange apparatus includes an outer shell defining a cavity and a volume-occupying member received within the cavity. The outer shell and the volume-occupying member cooperate to define a fluid-receiving volume therebetween. An opening in the outer shell defines a passageway for receiving a liquid to be heated therethrough. The opening includes a fastener for removably attaching to an open top of a container containing a liquid to be heated, wherein the liquid to be heated will flow from the container into the fluid-receiving volume when the apparatus is inverted and the liquid will flow back into the container when the bottle is returned to the upright position.

20 Claims, 11 Drawing Sheets

(56) References Cited

U.S. PATENT DOCUMENTS

| | | | |
|---|---|---|---|
| 3,200,879 A * | 8/1965 | Scanlon | 165/73 |
| 3,241,724 A * | 3/1966 | Lerner | 222/146.3 |
| 3,402,763 A | 9/1968 | Peterson | |
| 3,658,122 A | 4/1972 | Kalyk | |
| 4,024,987 A * | 5/1977 | Myles | 222/146.3 |
| 4,325,230 A * | 4/1982 | Driscoll et al. | 62/293 |
| 4,597,435 A | 7/1986 | Fosco, Jr. | |
| 4,598,768 A * | 7/1986 | Tenne | 165/165 |
| 4,818,114 A * | 4/1989 | Ghavi | 366/130 |
| 4,930,645 A * | 6/1990 | Warehime | 215/11.1 |
| 5,397,031 A * | 3/1995 | Jensen | 222/146.5 |
| 5,456,090 A * | 10/1995 | McCoy | 62/372 |
| 5,462,101 A * | 10/1995 | Mouchmouchian | 141/364 |
| 5,682,931 A | 11/1997 | Mouchmouchian | |
| 5,788,369 A * | 8/1998 | Tseng | 366/130 |
| 5,807,156 A * | 9/1998 | Owen | 446/77 |
| 6,814,247 B2 * | 11/2004 | Matthias | 215/11.1 |
| 2003/0205548 A1 * | 11/2003 | Seckler | 215/11.1 |
| 2006/0081599 A1 * | 4/2006 | Anderson | 219/438 |
| 2006/0213205 A1 | 9/2006 | Reverendo | |
| 2007/0144703 A1 * | 6/2007 | Kolowich | 165/10 |
| 2008/0302822 A1 * | 12/2008 | Tetreault et al. | 222/146.6 |
| 2012/0061050 A1 * | 3/2012 | Petrillo et al. | 165/63 |
| 2012/0199338 A1 * | 8/2012 | Marx | 165/287 |

* cited by examiner ically throughout the views, FIG. 1 illustrates an exemplary

HEAT EXCHANGE APPARATUS AND METHOD

CROSS-REFERENCE TO RELATED APPLICATION

This application claims the benefit of priority under 35 U.S.C. §119(e) based on U.S. Provisional Application No. 61/368,461, filed Jul. 28, 2010. The aforementioned provisional application is incorporated by reference herein in its entirety.

BACKGROUND

The present disclosure is directed to an apparatus and method for changing the temperature of a liquid. It finds particular application in warming the beverage contents of a baby's bottle and will be described herein primarily in reference thereto. However, it will be appreciated that the present development may be employed in conjunction with all manner of beverages or other liquids to be warmed or cooled.

Numerous methods are known for heating the contents of a baby bottle prior to feeding, for example, where bottles containing a baby's beverage such as milk or formula have been prepared in advance for later feeding. One prior art method is to immerse the bottle in a bowl of hot water and allow the hot water and the bottle contents to equilibrate. This method is advantageous in that overheating the bottle can readily be avoided, because the bottle contents will never achieve a temperature greater than the temperature of the hot water used to heat the bottle. However, this method is relatively slow. For example, it has been found that heating the contents of a glass bottle in hot water can take approximately 10 minutes. Other methods, such as warming the bottle contents on a stovetop or in a microwave oven, while faster, are prone to overheating the bottle contents. Still other methods involve the use of commercially available bottle warmers. However, these devices are typically electrically operated and thus require a source of electricity, such as batteries or an electrical outlet.

Accordingly, the present invention contemplates a new and improved bottle-warming device and method which can heat the contents of a baby's bottle quickly and efficiently, but without the risk of overheating the bottle contents and without the need for an electrical power supply.

SUMMARY

In one aspect, a heat exchange apparatus includes an outer shell defining a cavity and a volume-occupying member received within the cavity. The outer shell and the volume-occupying member cooperate to define a fluid-receiving volume therebetween. An opening in the outer shell defines a passageway for receiving a liquid to be heated therethrough. The opening includes a fastener for removably attaching to an open top of a container containing a liquid to be heated, wherein the liquid to be heated will flow from the container into the fluid-receiving volume when the apparatus is inverted and the liquid will flow back into the container when the bottle is returned to the upright position.

In another aspect, a heat exchange apparatus includes an inner bowl member, an outer bowl member, and a base which sealingly engages the rims of the inner and outer bowls. A peripheral wall or skirt surrounds the outer bowl member and defines a reservoir for receiving a heat exchange medium. The outer bowl includes a fastener for attachment to the top of an open baby bottle whereby a volume of liquid to be heated will flow from the bottle into the volume between the inner and outer bowls when the apparatus is inverted. Once inverted, hot or warm water is introduced into the reservoir, which serves as the heat exchange medium. When the liquid is heated, the unit is inverted back to the original position, whereby the heated liquid will flow back into the bottle.

In another aspect, a method of changing the temperature of a liquid using a heat exchange device is provided.

One advantage of the present development resides in the speed with which the bottle contents can be heated as compared to conventional methods that rely on thermal transfer, such as placing a cold, full bottle into a container of hot or warm water.

Another advantage of the present development is that it is not prone to overheating the bottle contents, as can occur when bottles are heated in a microwave oven or when the contents are heated on a stovetop. Because the present invention is based on principles of thermal equilibrium, the bottle contents will never achieve a temperature greater than the temperature of the water used as the thermal transfer medium.

It is to be understood that both the foregoing general description and the following detailed description are exemplary and explanatory only and are not restrictive of the invention as claimed. The accompanying drawings, which are incorporated in and constitute a part of the specification, illustrate embodiments of the invention and, together with the general description, serve to explain the principles of the invention.

BRIEF DESCRIPTION OF THE DRAWINGS

In the accompanying drawings, which are only for purposes of illustrating preferred embodiments and are not to be construed as limiting the invention.

DETAILED DESCRIPTION OF THE PREFERRED EMBODIMENTS

Figure 1:
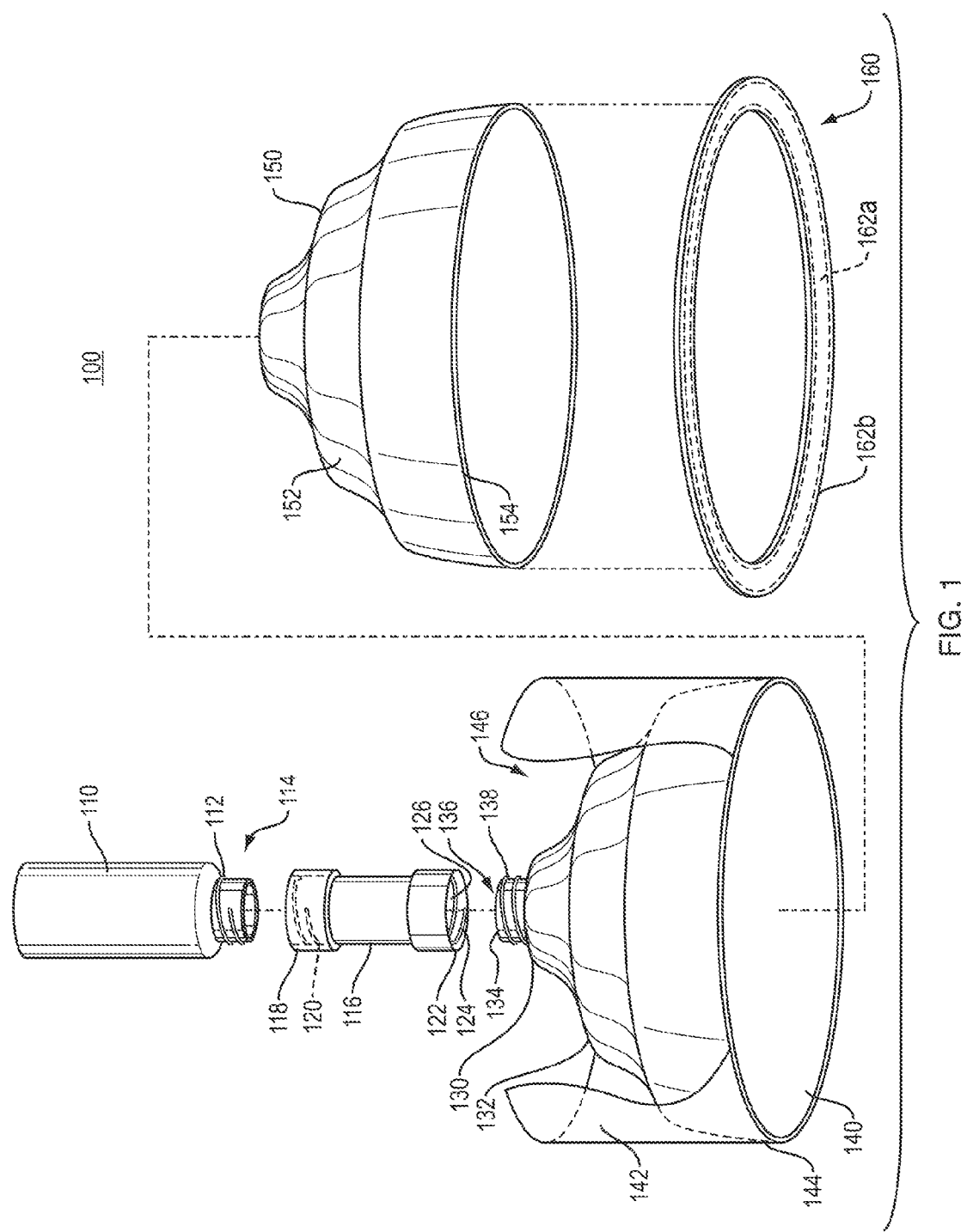
FIG. 1 is an exploded perspective view showing a first exemplary embodiment of a heat exchange device.

With reference to the drawings, wherein like reference numerals are used to indicate like or analogous components throughout the several views, FIG. 1 illustrates a heat exchange device 100 for heating the contents of a bottle 110, such as a baby bottle having a neck portion 112 with external helical threads 114 for rotatably receiving a nipple and threaded bezel or collar (not shown), as would be understood by persons skilled in the art.

An adapter 116 includes a first end 118 having internal helical threads 120 (shown in broken lines) for removable attachment to the bottle neck 112 and a second end 122 having internal helical threads 124 for removable attachment to an outer bowl member 130. The adapter includes an internal bore 126 defining a passageway for transferring the contents of the bottle 110 into the heat exchange cavity 156 (see FIG. 2) of the device 100, as will be described in greater detail below.

The outer bowl member 130 includes a heat exchange surface 132 and a neck 134 defining an opening 136 and having external threads 138 which are complimentary with the threads 124 for removably attaching the second end of the adapter 116. The outer bowl member 130, or at least the heat exchange surface portion 132 thereof, is formed of a thermally conductive material to provide a thermally conductive pathway between the exterior facing surface of the heat exchange surface 132 and the interior facing surface of the heat exchange surface 132. Such thermally conductive materials may be, for example, stainless steel, aluminum, anodized aluminum, copper, silver, or other metal or metal alloy. Alternatively, the outer bowl member 130, or at least the heat exchange surface portion 132 thereof, could be formed of a thermally conductive polymer material, such as a composite material having a polymeric matrix and a thermally conductive filler. Thermally conductive protrusions, such as fins, vanes, pins, or the like may optionally be provided on either or both of the inner and outer surfaces of the heat exchange portion 132.

The outer bowl member 130 also includes a lower (in the orientation shown in FIG. 1) peripheral edge 140. It is preferred, but not required, that the cross-sectional profile of the outer bowl member 130 (which can best be seen in FIG. 2) be convoluted so as to increase the surface area of the heat exchange surface 132. For example, in the embodiment depicted in FIG. 1, the outer bowl member 130 has a generally corrugated or step-shaped cross-sectional profile, although other configurations are contemplated. It is also contemplated, however, that the outer bowl member 130 could have a non-convoluted or less convoluted profile, for example, a generally hemispherical or dome shape, a generally conical shape, or other geometric profile. It is also not necessary that the outer bowl member have a circular peripheral shape.

A generally upstanding peripheral wall or skirt 142 (shown in fragmentary view in FIG. 1 for ease of exposition) includes a lower edge 144 which may be attached to the lower peripheral edge 140 of the outer bowl member 130. The lower edges 140 and 144 of the outer bowl member 130 and the peripheral wall 142, respectively, may be permanently attached, e.g., via welding, adhesive, crimping, and so forth. Alternatively, the peripheral wall 142 and the outer bowl member 130 may comprise a unitary or monolithic structure, for example, formed by casting, stamping, etc. The heat exchange surface 132 and the wall member 142 cooperate to define a hot water reservoir 146 for holding the hot water which serves as a heat exchange medium during use. The peripheral wall 142 could be formed of any material, such as metal, polymer, etc. Although the outer bowl member 130 and the peripheral wall 142 may be formed of the same material, it is not necessary. It is also not necessary that the wall 142 be formed of a thermally conductive material. The outer surfaces of the unit 100 may be painted, anodized, or otherwise decorated.

An inner bowl member 150 includes an outer surface 152 and a peripheral edge 154. The inner bowl member 150 is smaller than the outer bowl member 130 such that the inner bowl member 150 will nest within the outer bowl member 130 to define a volume 156 (see FIG. 2) between the outer surface 152 and the interior surface of the heat exchange surface 132. The outer bowl member 130 and the inner bowl member 150 are preferably sized and positioned such that the volume of the heat exchange volume 156 is large enough hold the contents of a standard baby bottle, for example, 8 fluid ounces, although it will be recognized that other volumes are contemplated. Preferably, the profile of the inner bowl member 150 matches that of the outer bowl member 130, so as to define a volume 156 that is substantially uniformly thin. Although the outer bowl member 130 and the inner bowl member 150 may be formed of the same material, it is not necessary. It is also not necessary that the inner bowl member 150 be formed of a thermally conductive material.

A base 160, which is ring shaped in the embodiment of FIG. 1, includes an outer groove 162b and a concentric inner groove 162a. The outer groove 162b is sized to sealingly receive the conjoined peripheral edges 140, 144 of the outer bowl member 130 and the peripheral wall 142, respectively. The base 160 is preferably formed of a polymeric material such as rubber, silicone, or other plastic material. In the depicted preferred embodiment, the peripheral edges 140, 144, and 154 are secured in the respective grooves 162b, 162a via a friction fit, press fit, snap fit, etc., so as to provide a sealing engagement for retaining the liquid to be warmed within the volume 156. It will be recognized that other means for securing the peripheral edges 140, 144, and 154 within in the respective grooves 162b, 162a, such as a threaded interface, may be employed.

In operation, the base 160, inner bowl 150, and outer bowl 130, and peripheral wall 142 are assembled and this entire assembly is inverted (so that the neck of the outer bowl member is pointing down) and screwed (with or without the adaptor 116, as the case may be) onto the threaded top of a full baby bottle 110 containing milk, formula, juice, etc., to be heated. That is, the heat exchange assembly is attached to the neck 112 of a standard bottle in place of the bottle's cap or nipple.

Then, the bottle 110 with the heat exchange unit 110 attached is inverted so that the bottle 100 is on top and the bottle contents drain through the opening 136 and into the volume 156. The reservoir 146 defined by the wall member 142 and the heat exchange surface 132 of the outer bowl 130 is then filled with hot or warm water, e.g., hot or warm tap water. After a sufficient time, e.g., about 60 seconds, the baby beverage is heated and the entire unit is then inverted so that the warmed liquid runs from the volume 156 back into the bottle 110, which remains attached during the heating process. The heat exchange assembly 100 is unscrewed from the bottle 110 for fitting of the bottle's standard nipple assembly. The water used for heating is discarded and the inner and outer bowls 150, 130, and the base 160 can be disassembled from each other for easy cleaning.

Figure 2:
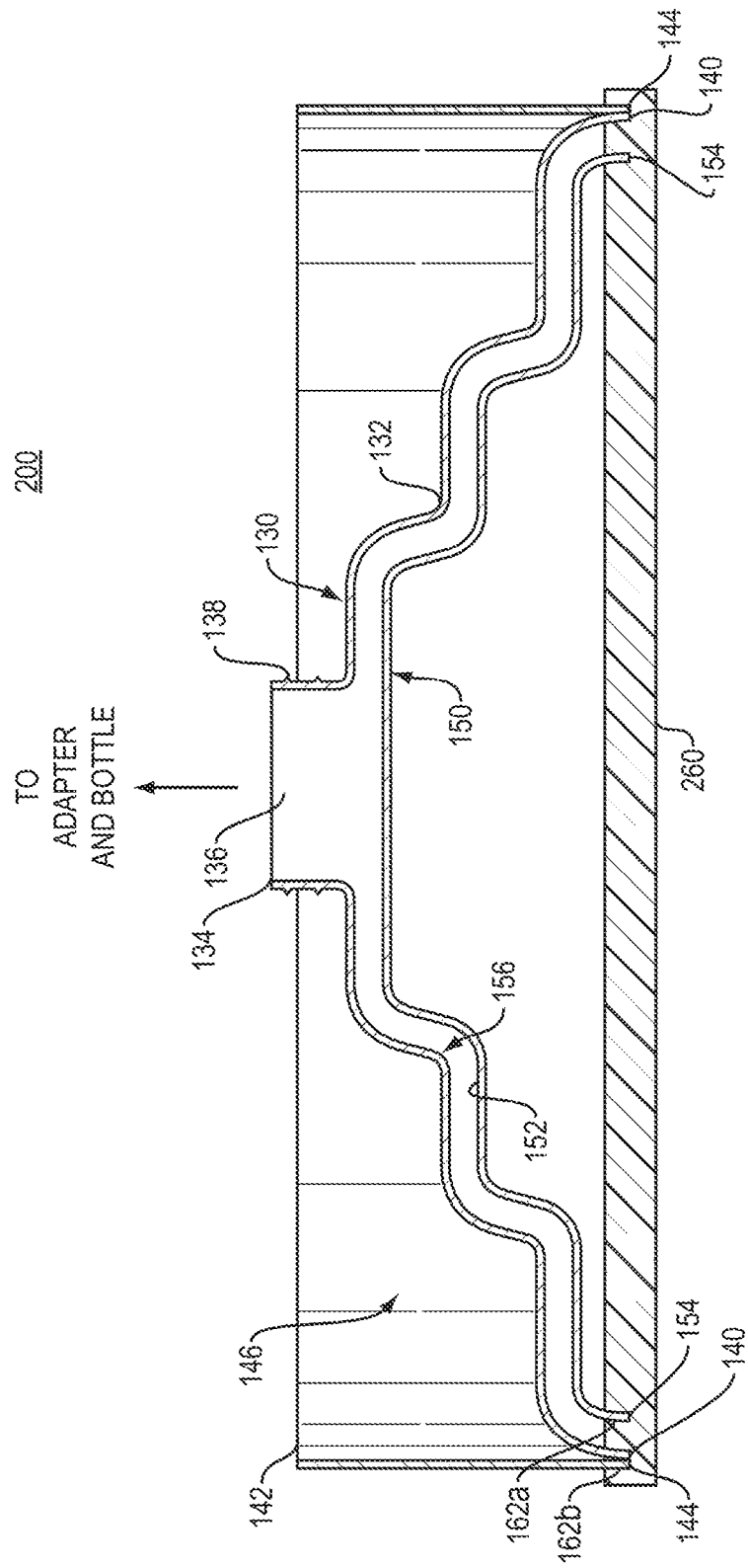
FIG. 2 is a side cross-sectional view of a second exemplary embodiment heat exchanger herein.

Referring now to FIG. 2, there appears a second embodiment heat exchange device 200, which is the same as the embodiment 100 described above in reference to FIG. 1, with the exception that the ring-shaped base 160 of the FIG. 1 embodiment has been replaced with a generally disc-shaped base 260. In all other respects, the above description with respect to FIG. 1 is equally applicable to FIG. 2.

Some variations will now be discussed. For example, it is possible to omit the adapter 116 and replace the external threads 138 on the neck 134 with internal threads complimentary to the external threads on the bottle 110 so that the bottle 110 can be attached directly to the outer bowl member 130 without the use of an adapter. It will be recognized that in such embodiments wherein the bottle 110 attaches directly to the outer bowl member 130, the threaded neck portion may be a separately formed of a plastic or polymeric material, e.g., overmolded or otherwise separately formed and attached. In the case of a metal heat exchange portion 132, it may be advantageous to form the neck/collar portion 134 of plastic. For example, when the baby bottle 110 is formed of glass, it may be desirable to avoid screwing a glass bottle onto a metal neck, which could result in chipping or scratching the glass. In other embodiments, a plurality of adapters may be provided to allow the unit to be adapted for use with a plurality of bottle neck sizes.

Figure 3:
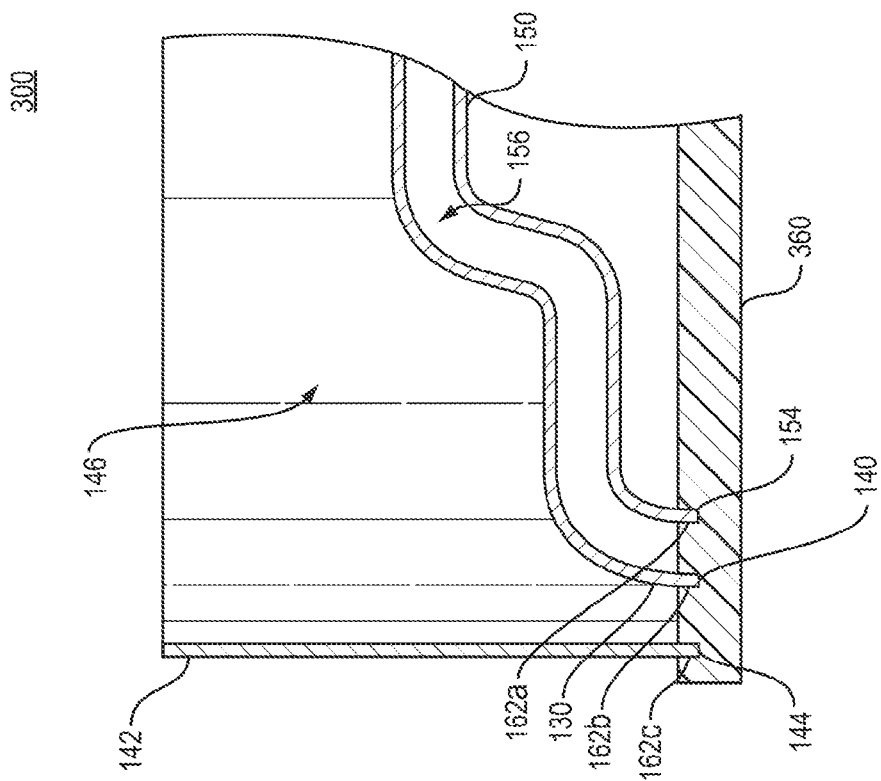
FIG. 3 is a fragmentary, side cross-sectional view of third exemplary embodiment.

Referring now to FIG. 3, there is shown a further embodiment 300 which may be as described above in reference to FIG. 2, but wherein the peripheral wall 142 is separate from the outer bowl member 130 and the base member 360 includes three grooves 162a, 162b, and 162c, for receiving the peripheral edges 154, 140, and 144, respectively. Although the base 360 appears as a disc configuration, it may also be a ring configuration as shown in FIG. 1 with three grooves. In all other respects, the embodiment 300 of FIG. 3 may be as otherwise described by way of reference to embodiments 100 and 200 of FIGS. 1 and 2.

Figure 4:
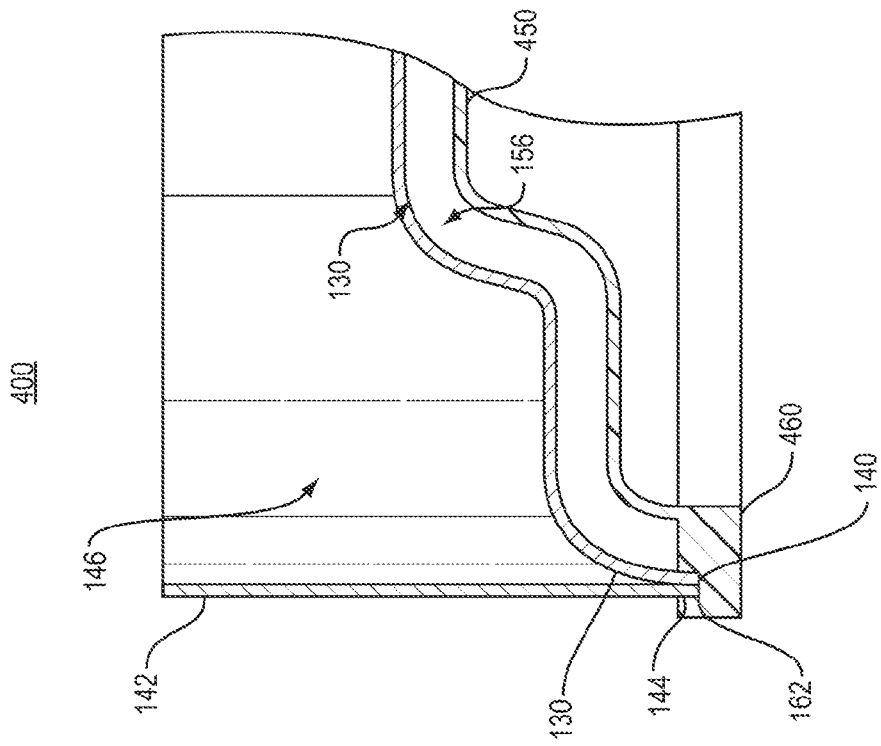
FIG. 4 is a fragmentary, side cross-sectional view of fourth exemplary embodiment.

Referring now to FIG. 4, there is shown a further embodiment 400 which may be as otherwise described above by way of reference to FIG. 3, except (1) the base member and inner bowl have been replaced with a base ring 460 having an inner bowl member 450 integrally formed; and (2) the outer bowl member 130 and the peripheral wall 142 are attached as described above by way of reference to FIG. 1. The base ring 460 includes a single groove 162 for receiving the conjoined peripheral edges 144 and 140. In yet a further embodiment (not shown), the FIG. 4 embodiment could be modified such that the outer bowl member 130 and the peripheral wall 142 are separated and received in separate grooves in the base in the same manner as in FIGS. 1 and 3.

Figure 5:
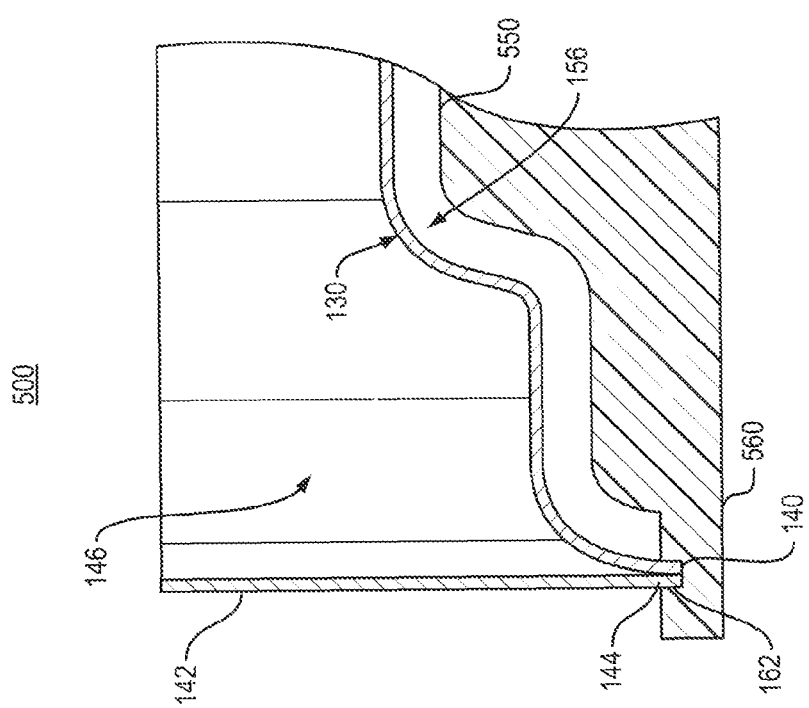
FIG. 5 is a fragmentary, side cross-sectional view of fifth exemplary embodiment.

Referring now to FIG. 5, there is shown a further embodiment 500 which may be as otherwise described above by way of reference to FIG. 4, except that the base ring and inner bowl member have been replaced with an inner bowl member 550 having a solid interior and a solid, disc-like base 560. In yet a further embodiment (not shown), the FIG. 5 embodiment could be further modified such that the outer bowl member 130 and the peripheral wall 142 are separated and received in separate grooves in the base in the same manner as in FIGS. 1 and 3.

Figure 6:
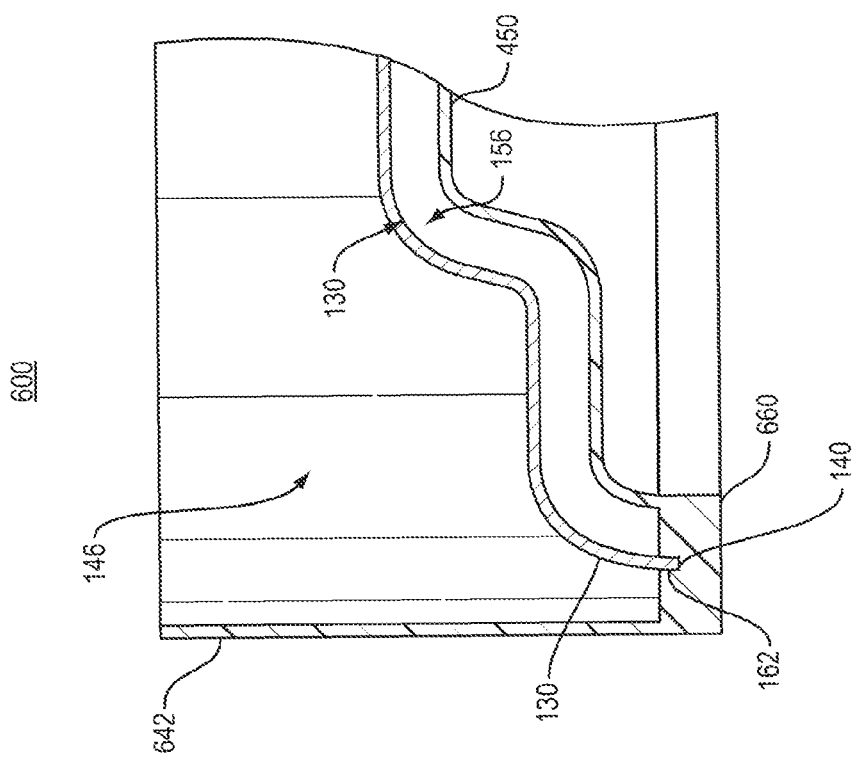
FIG. 6 is a fragmentary, side cross-sectional view of sixth exemplary embodiment.

Referring now to FIG. 6, there is shown a further embodiment 600 which may be as otherwise described above by way of reference to FIG. 4, except that the peripheral wall defining the reservoir 146 has been replaced with a peripheral wall 642 which is integrally formed with the base ring 660 and the inner bowl member 450.

Figure 7:
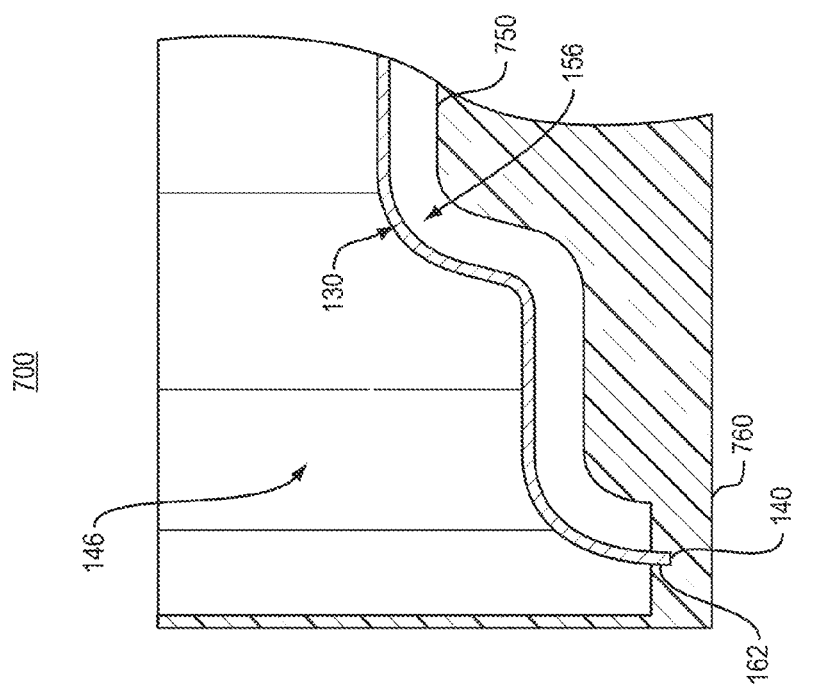
FIG. 7 is a fragmentary, side cross-sectional view of seventh exemplary embodiment.

Referring now to FIG. 7, there is shown a further embodiment 700 which may be as otherwise described above by way of reference to FIG. 6, except that the base ring and inner bowl member have been replaced with an inner bowl member 750 having a solid interior and a solid, disc-like base 760.

Figure 8:
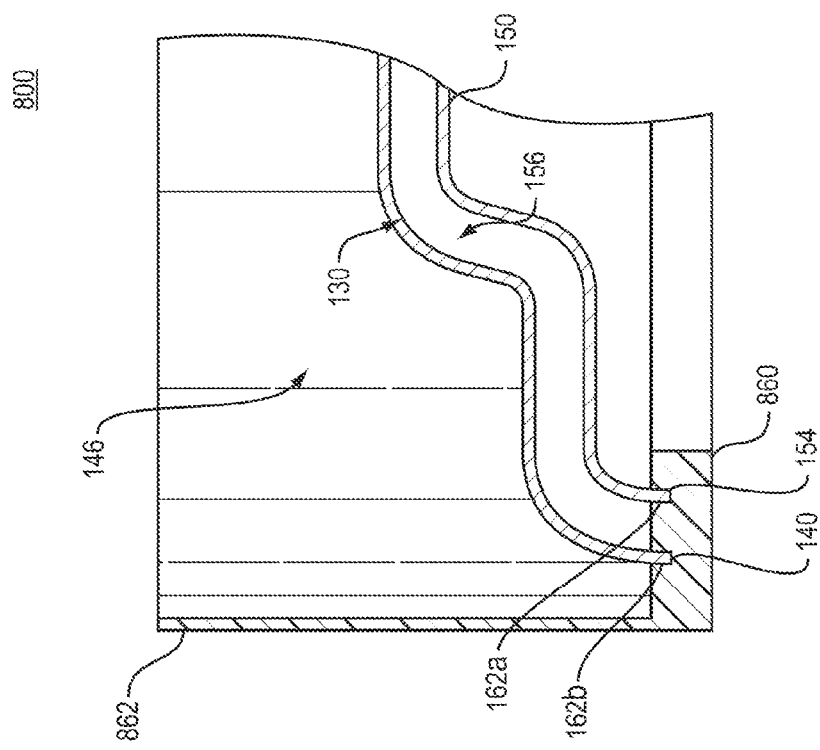
FIG. 8 is a fragmentary, side cross-sectional view of eighth exemplary embodiment.

Referring now to FIG. 8, there is shown a further embodiment 800 which may be as otherwise described above by way of reference to FIG. 3, except that the base disc and separable wall have been replaced with a base ring 860 having an integrally formed upstanding wall 862 extending about the periphery thereof. Alternatively, the ring-like base 860 could be replaced with a solid disc-like base.

Figure 9:
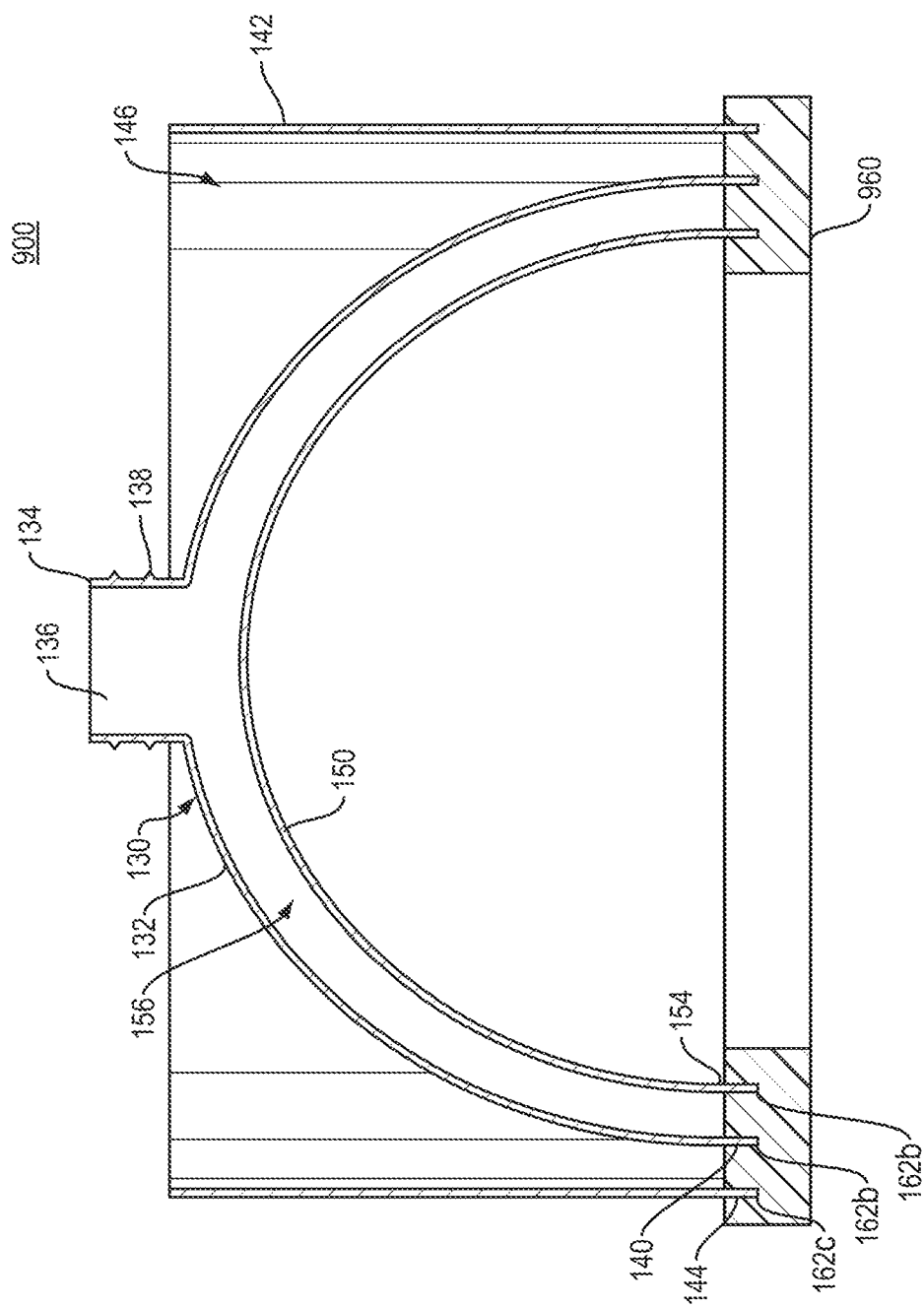
FIG. 9 is a side cross-sectional view of ninth exemplary embodiment.

Referring now to FIG. 9, there is shown a further embodiment 900 which is as described above by way of reference to FIG. 3, except that the inner and outer bowl members 150 and 130, respectively, are generally dome shaped and the disc-configured base of FIG. 3 has been replaced with a ring-type base 960. In further embodiments, inner and outer bowl members having other geometric configurations, including without limitation generally conical or frustoconical shapes are contemplated. In still further embodiments, any one or more of the variations described above such as modifying the neck to omit the adapter, combination of the outer bowl member and the peripheral wall, disc configuration of the base, integration of the peripheral wall and/or inner bowl member with the base, solid or hollow inner bowl member, and so forth are also equally applicable to the FIG. 9 embodiment.

Figure 10:
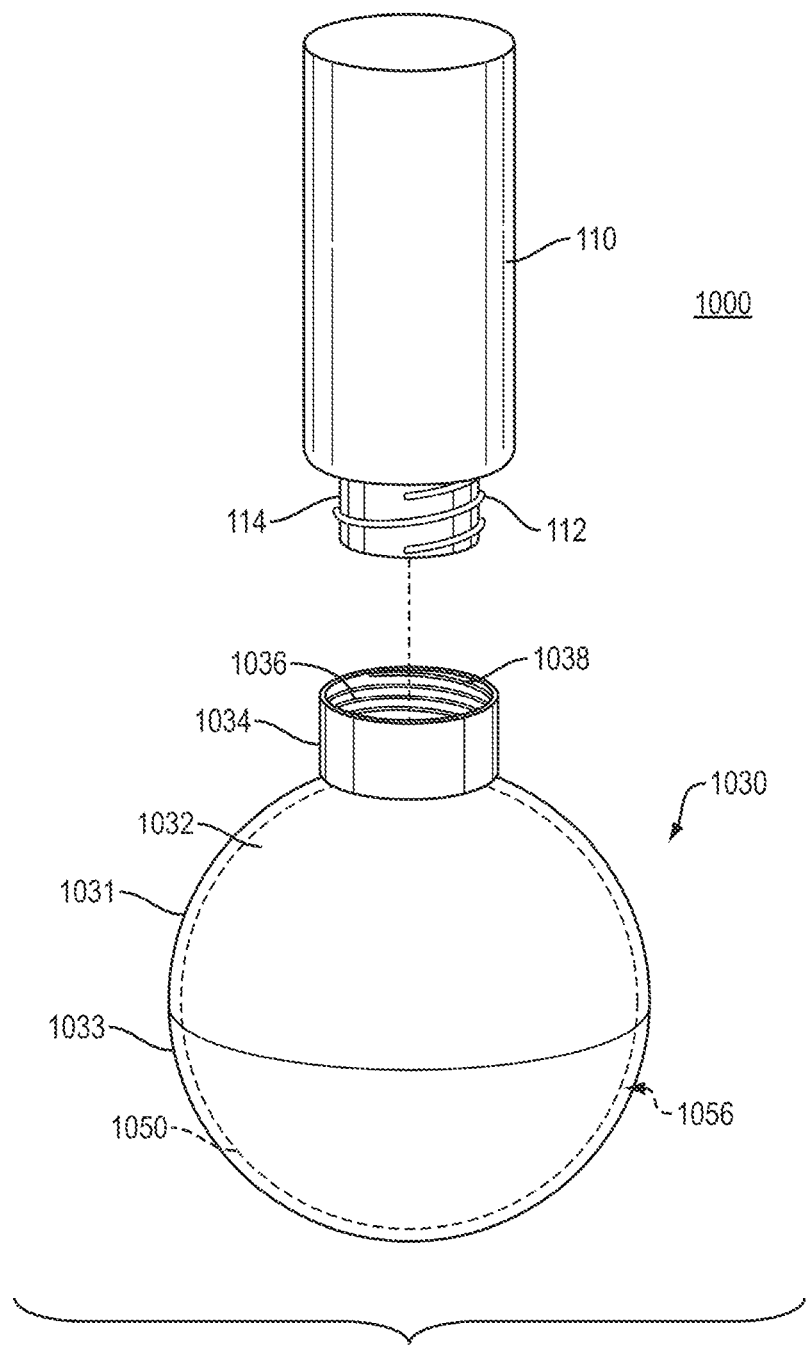
FIG. 10 is a perspective view illustrating a tenth exemplary embodiment.
Figure 11:
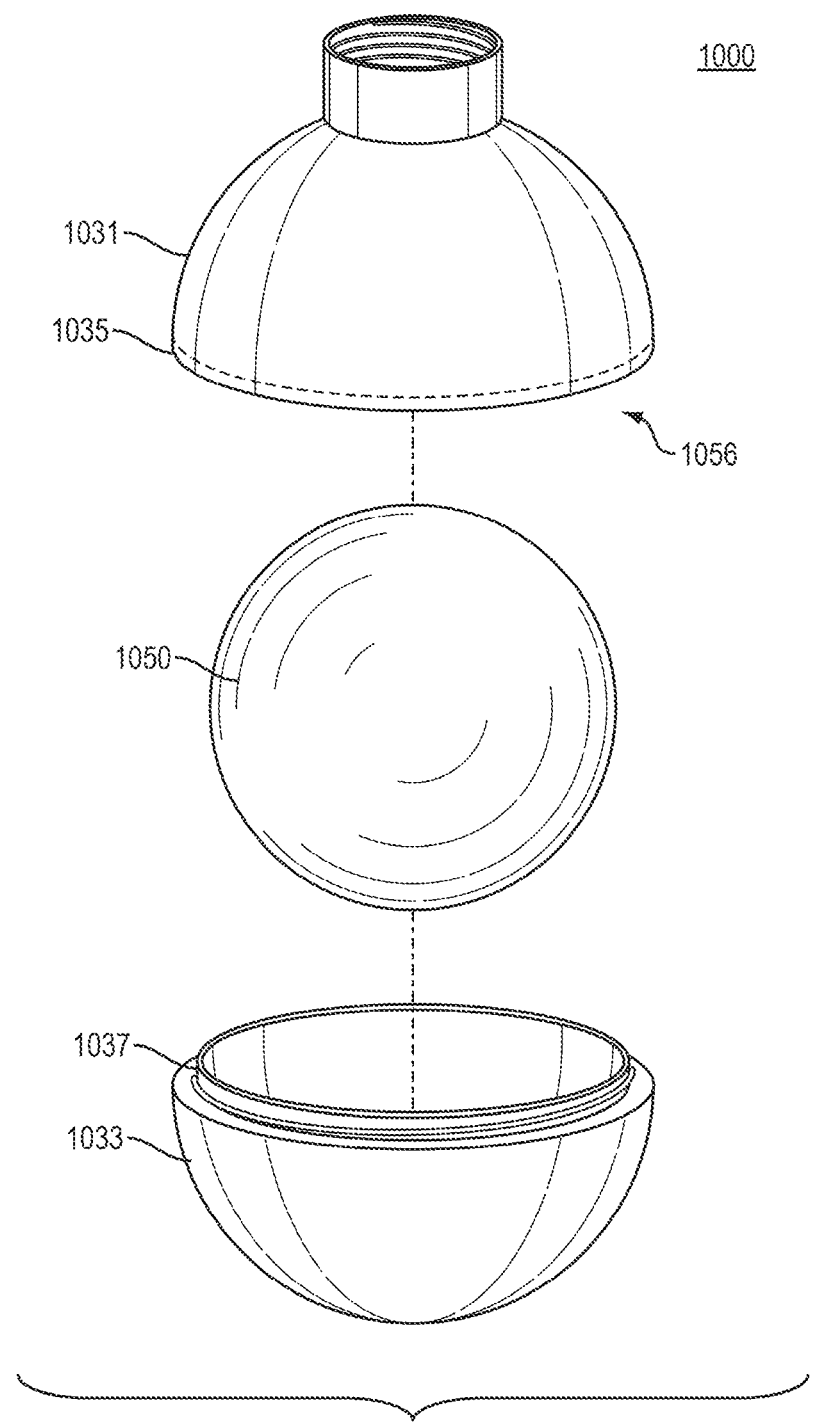
FIG. 11 is an exploded view of the embodiment appearing in FIG. 10.

Referring now to FIGS. 10 and 11, there is shown a further embodiment heat exchange device 1000 for heating the contents of a baby bottle 110, which includes an outer container 1030 defining a heat exchange surface 1032 and comprising separable first and second shells 1031 and 1033, respectively. The first shell 1031 includes a threaded neck 1034 defining an opening 1036 and having threads 1038 for removably attaching the threaded neck 112 which in turn has complimentary threads 114. In alternative embodiments, an adapter for connecting the baby bottle 110 to the first shell 1031 may be employed, as described above.

The first shell 1031 includes a threaded rim 1035 which mates with a complimentary threaded rim 1037 on the second shell 1033. The threaded connection between the shells 1031 and 1033 may be replaced with another fastener, such as friction fit fastener, buckles, clips, etc. An inner volume-occupying member 1050, which may be a sealed hollow member or a solid member, is placed within the interior cavity defined by the two shells 1031 and 1033 to confine the liquid to be heated to a relatively thin layer 1056 adjacent the heat exchange surface 1032 for efficient heating of the liquid. The outer shells 1031, 1033 defining the heat exchange surface 1032 are formed of a thermally conductive material as described above. It is not necessary that the volume-occupying member 1050 be thermally conductive. The surface 1032 is depicted as being a generally smooth surface, however, in alternative embodiments, the surface 1032 may optionally have dimples, corrugations, or the like to increase the surface area of the surface 1032 to thereby provide more efficient heat transfer. Although the embodiment 1000 is shown as being generally spherical, it will be recognized that other shapes or geometric configurations are possible.

In operation, the first shell 1031 and second shell 1033 are assembled about the volume occupying member 1050, and this entire assembly is inverted and screwed (with or without an adaptor, as the case may be) onto the threaded top of a full baby bottle 110 containing the liquid to be heated.

The bottle with the heat exchange unit 1000 attached is then inverted so that the bottle contents drain through the opening 1036 and into the volume 1056. The heat exchange surface 1032 of the device 1000 is then heated, for example, by holding the unit under running hot or warm water or immersing the unit in a container such as a bowl, sink, or other container filled with hot or warm water. After a sufficient time, the liquid is heated and the entire unit is then inverted so that the warmed liquid runs from the volume 1056 back into the bottle 110, which remains attached during the heating process. The heat exchange assembly 1000 is unscrewed from the bottle 110 for fitting of the bottle's standard cap/nipple.

The shells 1031, 1033 and the volume-occupying member 1050 can then be disassembled from each other for easy cleaning.

Figure 12:
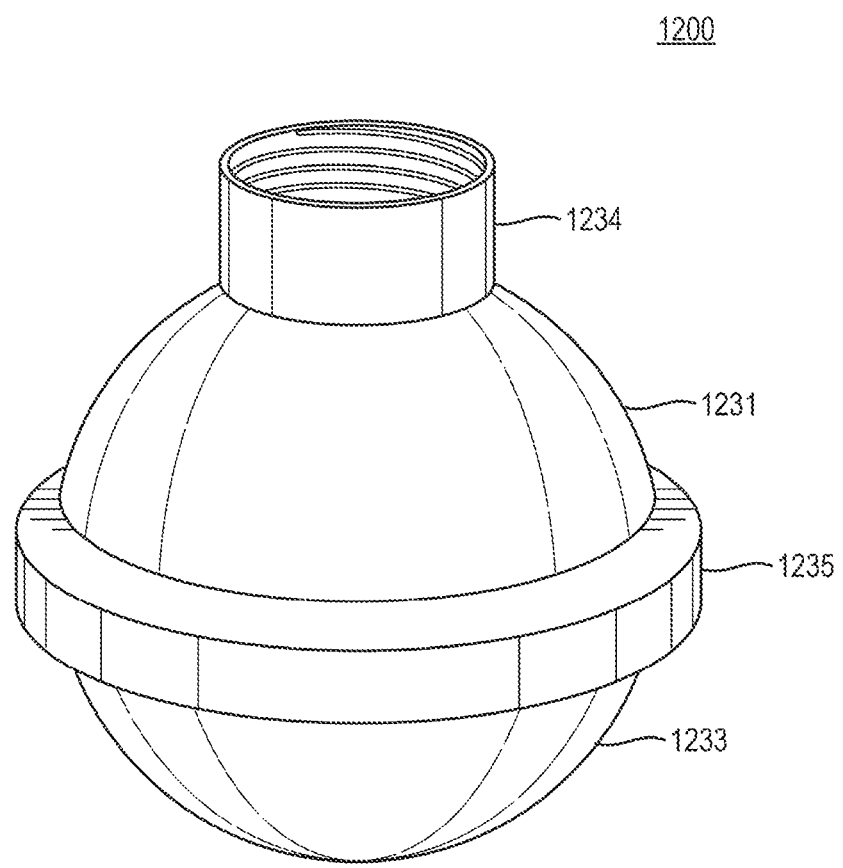
FIG. 12 is an isometric view of a tenth exemplary embodiment.
Figure 13:
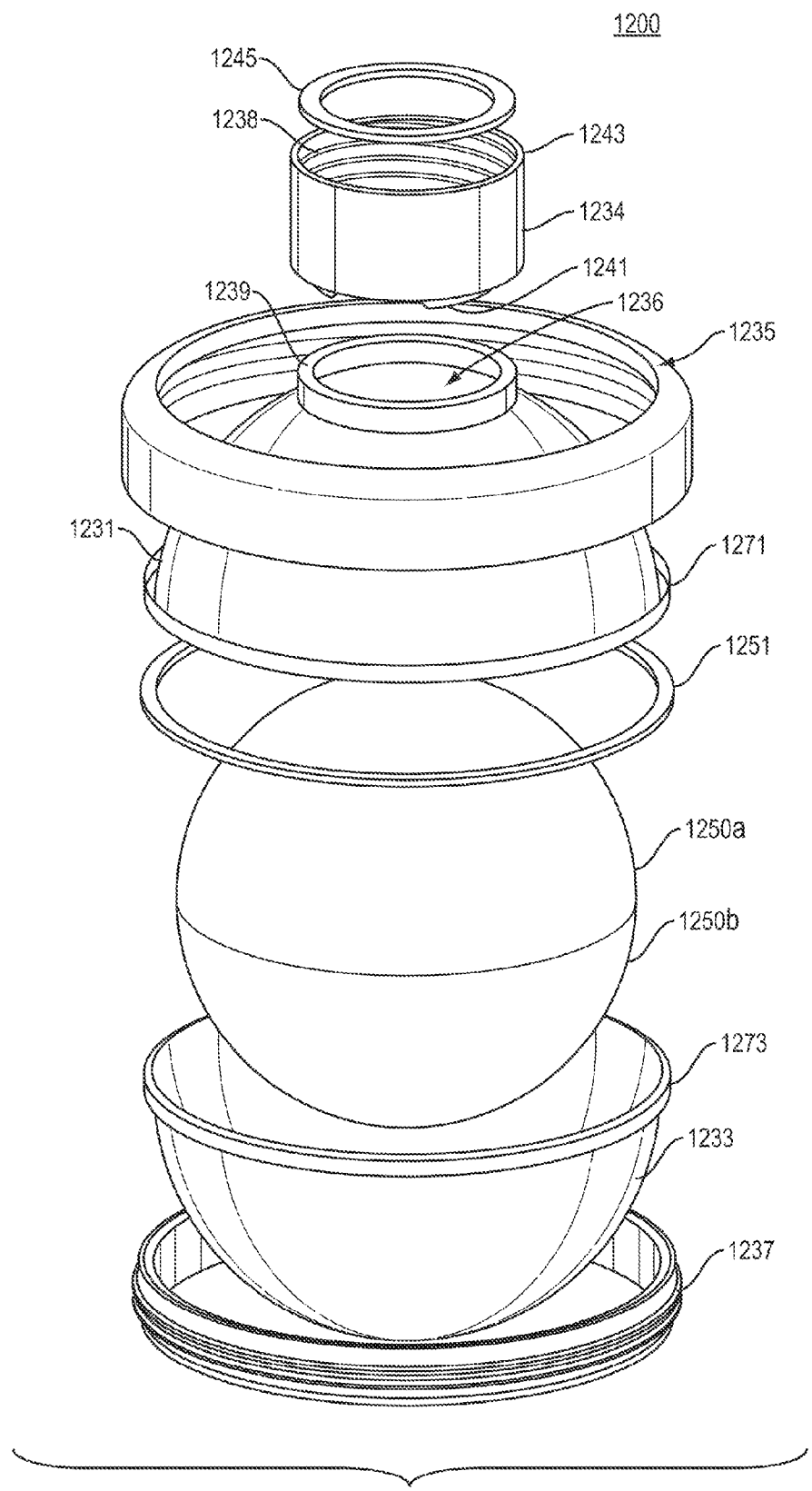
FIG. 13 is an exploded view of the embodiment appearing in FIG. 12.
Figure 14:
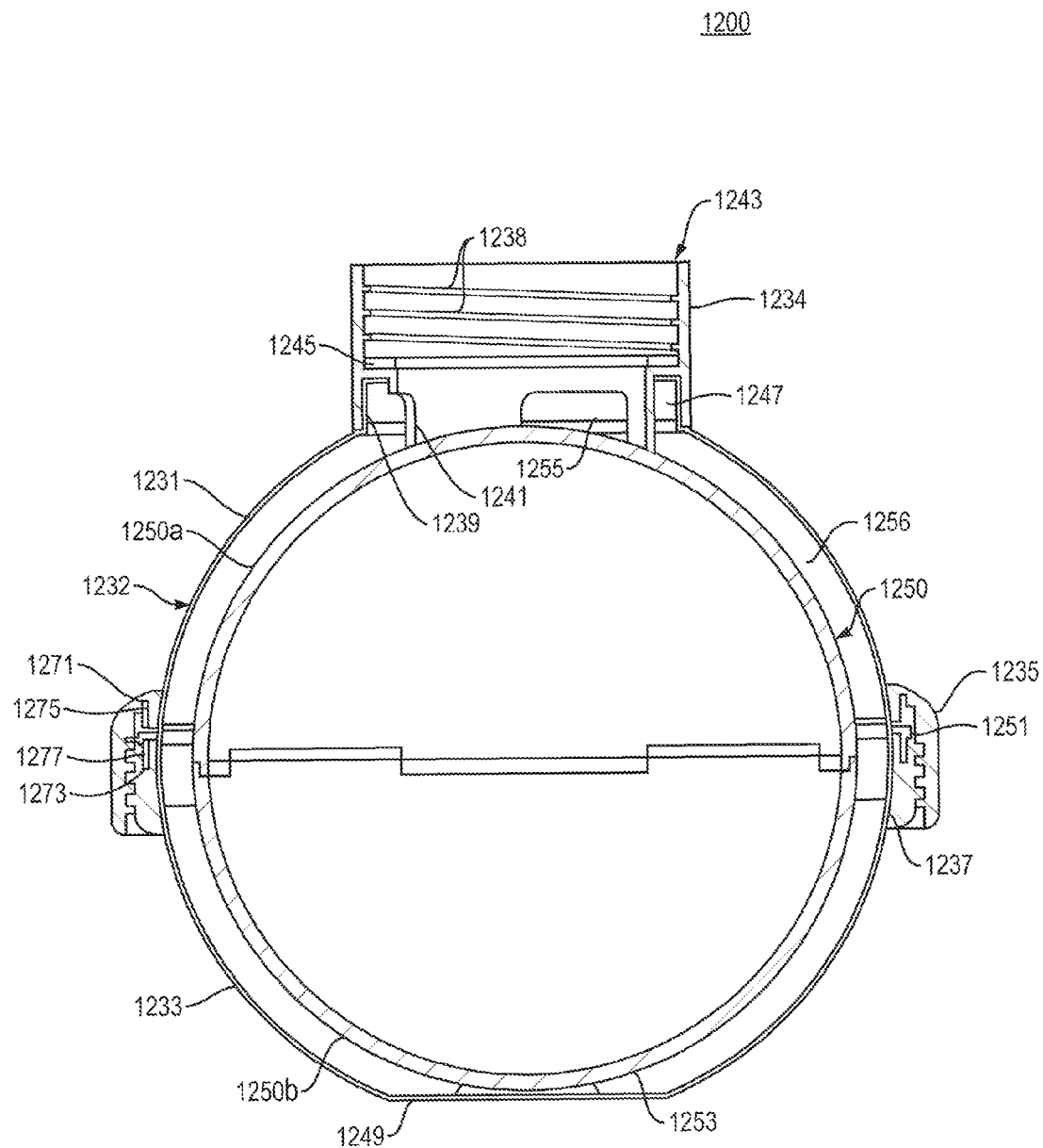
FIG. 14 is a side cross-sectional view of the embodiment appearing in FIG. 12.

Referring now to FIGS. 12-14, there is yet a further embodiment heat exchange device 1200 for heating the contents of a baby bottle (not shown), which includes an outer container defining a heat exchange surface 1232 comprising separable first and second shells 1231 and 1233, respectively. A first threaded member 1235 is secured to the first outer shell member 1231 and a second threaded member 1237 is secured to the second outer shell member 1233. The first and second threaded members 1235 and 1237 are complementary to allow the members to be removably and rotatably secured together to form a generally spherical enclosure defining an interior cavity. A gasket or sealing ring 1251 may be provided within the fastener 1235 to provide a sealing interference between the first and second outer shells 1231 and 1233 when the unit is assembled. The sealing ring 1251 may be formed of a resilient or flexible material such as silicone. The first and second threaded members 1235 and 1237 may be formed of a plastic material, preferably a BPA-free plastic material such as polypropylene or the like.

In the depicted preferred embodiment, the first and second outer shell members 1231 and 1233 each include a flange or lip 1271 and 1273, respectively. The first threaded member 1235 includes a channel or groove 1275 which engages the lip 1271, thus retaining the first outer shell in a tongue-in-groove or bezel-type arrangement. The second threaded member 1237 includes a groove 1277 which engages the lip 1273, thus likewise retaining the second outer shell in a tongue-in-groove or bezel-type arrangement. The threaded members 1235 and 1237 may be permanently or nonremovably attached to the respective shell member 1231 and 1233, e.g., via adhesive bonding. Alternatively, the threaded members 1235 and 1237 could be removably attached to the respective outer shell member 1231 and 1233, e.g., via a snap fit or friction fit arrangement.

The first outer shell 1231 includes an opening 1236 having a threaded neck 1234 bounding the periphery thereof. For example, in the depicted embodiment, the first outer shell 1231 includes a generally upstanding (in the orientation shown) wall 1239 bounding the opening 1236. In the illustrated embodiment, the threaded neck 1234 includes a base portion 1241 opposite the threaded end 1243, the base portion having a slot, channel, groove, etc., 1247 receiving peripheral wall 1239. The threaded neck 1234 may be permanently or nonremovably attached to the outer shell member 1231, e.g., via adhesive bonding.

The neck 1234 has helical threads 1238 for removably attaching a threaded bottle. A sealing ring or gasket 1245 may be provided in the threaded end of the neck 1234 for providing a sealing interference between the neck 1234 and an attached bottle. The sealing ring 1245 may be formed of a resilient or flexible material such as silicone. The base outer shell member 1233 may be a truncated hemisphere, i.e., having a flattened bottom (in the orientation shown) surface 1249 to allow the apparatus to be stood on end during use, e.g., to allow the contents of an attached bottle to drain into the interior cavity defined by the outer shell members 1231 and 1233.

An inner volume-occupying member 1250 may comprise first and second generally semispherical shell members 1250a and 1250b, respectively, and may be secured via adhesive bonding, snap fit or friction fit arrangement, and so forth. The shell members 1250a and 1250b may be formed of a plastic or other non-thermally conductive material, preferably a BPA-free plastic, such as polypropylene.

In the illustrated preferred embodiment, the base portion 1241 bears against the volume-occupying member 1250 to secure the member 1250 in a fixed, centrally located position within the interior volume. Likewise, the base surface 1249 may include a centrally positioned interior rib or ridge, which contacts the volume-occupying member 1250 to centrally position the volume-occupying member within the interior volume. The base portion 1241 includes openings or cutouts 1255 to provide fluid communication between the bottle and the interior volume 1256.

In operation, the assembled volume-occupying member 1250 is placed within the interior cavity defined by the two shells 1231 and 1233 to confine the liquid to be heated to a relatively thin layer 1256 adjacent the heat exchange surface 1232 for efficient heating of the liquid. The outer shells 1231, 1233 defining the heat exchange surface 1232 are formed of a thermally conductive material as described above, preferably stainless steel, e.g., type 304 stainless steel. The surface 1232 is depicted as being a generally smooth surface, however, in alternative embodiments, the surface 1232 may optionally have dimples, corrugations, or the like to increase the surface area of the surface 1232 to thereby provide more efficient heat transfer. Although the embodiment 1200 is shown as being generally spherical, it will be recognized that other shapes or geometric configurations are possible.

In operation, the first shell 1231 and second shell 1233 are assembled about the volume occupying member 1250, and this entire assembly is inverted and the neck member 1234 is screwed onto the threaded top of a full baby bottle containing the liquid to be heated.

The bottle with the heat exchange unit 1200 attached is then inverted so that the bottle contents drain through the opening 1236 and into the volume 1256. The heat exchange surface 1232 of the device 1200 is then heated, for example, by holding the unit under running hot or warm water or immersing the unit in a container such as a bowl, sink, or other container filled with hot or warm water. After a sufficient time, the liquid is heated and the entire unit is then inverted so that the warmed liquid runs from the volume 1256 back into the bottle, which remains attached during the heating process. The heat exchange assembly 1200 is unscrewed from the bottle and replaced with the bottle's standard cap/nipple. The shells 1231, 1233 and the volume-occupying member 1250 can then be disassembled from each other for easy cleaning.

The invention has been described with reference to the preferred embodiments. Modifications and alterations will occur to others upon a reading and understanding of the preceding detailed description. By way of non-limiting example, it is contemplated that each of the embodiments shown and described above by way of FIGS. 1-9 could be modified to omit the outer wall or skirt and that the device could be heated by immersing the device in a separate container of warm or hot water or by holding the device under warm or hot running water. It is intended that the invention be construed as including all such modifications and alterations insofar as they come within the scope of the appended claims and equivalents thereof.

What is claimed is:

1. A heat exchange apparatus, comprising:
   an outer shell defining a heat exchange surface and having a first peripheral edge;
   a volume-occupying member disposed generally centrally within said outer shell and having a second peripheral edge, said outer shell and said volume-occupying member cooperating to define a fluid-receiving volume between an inner surface of said outer shell and an outer surface of said volume-occupying member;

an opening in said outer shell defining a passageway for receiving a liquid to be heated therethrough;

said opening including a fastener for removable attachment to an open top of a container containing a liquid to be heated, wherein the liquid to be heated will flow from the container into the fluid-receiving volume when the apparatus is inverted and the liquid will flow back into the container when the bottle is returned to the upright position;

said volume-occupying member being of a sufficient size to divert the liquid to be heated to a thin region immediately adjacent the inner surface of said outer shell;

a base member adjoining the outer shell to the volume-occupying member, the base member having a first annular groove removably receiving the first peripheral edge to provide a sealing engagement between the base member and the first peripheral edge.

2. The heat exchange apparatus of claim 1, wherein said fastener includes a helical thread complementary and mating with a threaded opening of a baby bottle.

3. The heat exchange apparatus of claim 1, wherein said fluid-receiving volume has a volume approximately equal to a volume of the container.

4. The heat exchange apparatus of claim 3, wherein the container is a baby bottle.

5. The heat exchange apparatus of claim 1, wherein said outer shell is formed of a thermally conductive material.

6. The heat exchange apparatus of claim 1, wherein said outer shell is formed of a metal or metal alloy.

7. The heat exchange apparatus of claim 1, wherein said outer shell is formed of stainless steel.

8. The heat exchange apparatus of claim 1, wherein said fastener comprises an adapter having a first end adapted for removable attachment to an open end of a baby bottle and a second end adapted for removable attachment to said outer shell, said fastener defining a fluid passageway between the bottle and said fluid-receiving volume.

9. The heat exchange apparatus of claim 1, wherein said fastener comprises a neck defining an inlet to the fluid-receiving volume and having an external helical thread.

10. The heat exchange apparatus of claim 1, wherein:
said outer shell and said volume occupying member are generally hemispherical in shape.

11. The heat exchange apparatus of claim 1, further comprising:
said base member having a second annular groove removably receiving the second peripheral edge to provide a sealing engagement between the base member and the second peripheral edge.

12. The heat exchange apparatus of claim 1, wherein said base member and said second peripheral edge are integrally formed.

13. The heat exchange apparatus of claim 10, further comprising:
a peripheral wall surrounding said outer shell and defining a reservoir for receiving a heat exchange medium.

14. The heat exchange apparatus of claim 13, further comprising:
said peripheral wall attached directly to said outer shell.

15. The heat exchange apparatus of claim 13, further comprising:
said peripheral wall attached directly to said base.

16. The heat exchange apparatus of claim 1, wherein said volume-occupying member is formed of plastic.

17. The heat exchange apparatus of claim 1, wherein the base member further comprises a second annular groove concentric with the first annular groove and disposed interiorly with respect to the first annular groove, the second annular groove removably receiving the second peripheral edge to provide a sealing engagement between the second peripheral edge and the base member.

18. A heat exchange apparatus, comprising:
a first outer shell having a first fastening member attached thereto;
a second outer shell having a second fastening member attached thereto, said second fastening complementary with said first fastening member for removably securing the first and second outer shells together, said first and second outer shells defining a cavity having an inward facing surface, the first and second outer shells cooperating to define a heat exchange surface;
a volume-occupying member disposed generally centrally within said cavity, said first and second outer shells and said volume-occupying member cooperating to define a fluid-receiving volume therebetween, the heat exchange surface configured to conduct heat from a heat exchange medium disposed exteriorly of the heat exchange surface to the fluid-receiving volume;
an opening in said first outer shell defining a passageway for receiving a liquid to be heated therethrough;
said opening including a third fastening member for removable attachment to an open top of a container containing the liquid to be heated, wherein the liquid to be heated will flow from the container into the fluid-receiving volume when the apparatus is inverted and the liquid will flow back into the container when the bottle is returned to the upright position; and
said volume-occupying member being of a sufficient size to divert the liquid to be heated to a thin region immediately adjacent the inward facing surface of said cavity.

19. The heat exchange apparatus of claim 18, wherein said fastener includes a helical thread complementary and mating with a threaded opening of a baby bottle.

20. The heat exchange apparatus of claim 18, wherein said fastener comprises an adapter having a first end adapted for removable attachment to an open end of a baby bottle and a second end adapted for removable attachment to said first outer shell, said fastener defining a fluid passageway between the bottle and said fluid-receiving volume.

* * * * *